United States Patent
Ekström et al.

(10) Patent No.: US 10,890,664 B2
(45) Date of Patent: Jan. 12, 2021

(54) SECURE GNSS POSITIONING IN VEHICLE UNIT

(71) Applicant: Stoneridge Electronics AB, Bromma (SE)

(72) Inventors: Peter Ekström, Skärholmen (SE); Arne Lohage, Bromma (SE); Mikael Jansson, Tullinge (SE)

(73) Assignee: STONERIDGE ELECTRONICS AB, Bromma (SE)

( * ) Notice: Subject to any disclaimer, the term of this patent is extended or adjusted under 35 U.S.C. 154(b) by 285 days.

(21) Appl. No.: 15/498,676

(22) Filed: Apr. 27, 2017

(65) Prior Publication Data

US 2017/0234986 A1    Aug. 17, 2017

Related U.S. Application Data

(63) Continuation of application No. PCT/SE2015/051127, filed on Oct. 23, 2015.

(30) Foreign Application Priority Data

Oct. 27, 2014    (SE) ...................... 1451285

(51) Int. Cl.
*G01S 19/21*    (2010.01)

(52) U.S. Cl.
CPC .................. *G01S 19/215* (2013.01)

(58) Field of Classification Search
None
See application file for complete search history.

(56) References Cited

U.S. PATENT DOCUMENTS

| | | | |
|---|---|---|---|
| 6,377,892 B1 | 4/2002 | Johnson et al. | |
| 2005/0038601 A1 | 2/2005 | Dentinger et al. | |
| 2011/0254731 A1 | 10/2011 | Musmeci | |
| 2013/0141276 A1 | 6/2013 | Artushkin et al. | |
| 2013/0176168 A1 | 7/2013 | Lo et al. | |
| 2014/0173282 A1* | 6/2014 | Pascariello | G06F 21/6218 713/171 |
| 2016/0154112 A1* | 6/2016 | Nichols | G01S 19/215 342/357.47 |

FOREIGN PATENT DOCUMENTS

WO    2010102681 A1    9/2010

* cited by examiner

*Primary Examiner* — Whitney Moore
(74) *Attorney, Agent, or Firm* — Gabriela B. Tomescu, Esq.; Bergenstråhle & Partners AB

(57) ABSTRACT

A vehicle unit adapted to receive a GNSS raw data signal, characterised in that it comprises a secure processor or secure microcontroller unit (MCU) adapted to authenticate the GNSS raw data signal and securely calculate a position of the vehicle unit based on the authenticated or to be authenticated GNSS raw data signal.

20 Claims, 5 Drawing Sheets

SECURE GNSS POSITIONING IN VEHICLE UNIT

This application is the continuation of International Application No. PCT/SE2015/051127, filed 23 Oct. 2015, which claims the benefit of Swedish Patent Application No. SE 1451285-9, filed 27 Oct. 2014, the entire contents of which are hereby incorporated by reference.

TECHNICAL FIELD

The present invention relates generally to a secure satellite positioning.

BACKGROUND ART

Today, transportation by vehicle requires measurement of parameters and information relating to the driver activities. This is not exclusively done to satisfy regulations regarding road transportation, but also for fleet management to measure and increase performance and efficiency, as well as for the purpose of electronic road tolling, monitoring vehicle or engine performance parameters, monitoring data relevant for special transports e.g. dangerous goods, livestock or refrigerated food etc. Therefore, most vehicles, such as lorry trucks, carry a vehicle unit (VU) to measure, store and possible also report the collected data. In the context of the present invention, the term "vehicle unit" shall be interpreted as a digital unit capable of gathering information relating to the vehicle. Examples of such information may be a geographical location, driving hours, distance traveled, start time, finish time, rest time, driver name, starting location and finishing location, exhaust measurements, fuel consumption, temperature data from vehicle or cargo sensors, opening and closing of cargo doors or operation of other vehicle systems, e.g. cranes and lifts etc. One example of a VU is a digital tachograph, capable of recording and digitally compiling and storing the vehicle data.

The digital tachograph is since May 2006 an established product within the transport industry. It is a unit mounted in the vehicles that under legislation are forced to have a digital tachograph installed in order to register driving times, rest times, odometer value and other data.

The EU legislation recently published (EC regulation 165/2014, February 2014) includes some new technical features. Within currently produced tachographs, the position of the vehicle at certain moments are entered manually by the driver and to an accuracy of which country the vehicle is in at the moment (Spain has additional accuracy down to region level, also manually entered). The new way of positioning the vehicle includes following requirements among others:

The position shall be based on a satellite signal,
The security assurance level shall be EAL4+ according to Common Criteria.
The position shall be recorded at
Start of daily drive period
End of daily drive period
Every three hours of accumulated driving time
The satellite data used for calculation of a position shall be free of charge
The position shall be automatically recorded
Non-secure satellite position data is broadcasted and therefore it is easy to manipulate and generate a ghost position which is a drawback with satellite positioning.

US 2013/0176168 discloses a controlled access satellite navigation receiver having only incomplete knowledge of secret codes transmitted by satellites. This incomplete knowledge allows only intermittent position determination. Incomplete secret codes and the intermittent positions they provide are useful for authenticating navigation signals or controlling access to secret satellite services.

SUMMARY OF THE INVENTION

It is an object of the invention to address at least some of the limitations, problems and issues outlined above. It is also an object to provide a solution for enabling secure positioning of a vehicle unit which may be carried out at a low cost and in a fast manner.

In a first aspect, a vehicle unit is provided, wherein the vehicle unit is adapted to receive a GNSS raw data signal, and wherein the vehicle unit further comprises a secure processor or secure microcontroller unit (MCU) adapted to authenticate the GNSS raw data signal and securely calculate a position of the vehicle unit based on the authenticated or to be authenticated GNSS raw data signal. Based on a satellite signal, e.g. from a Galileo satellite, which may be authenticated, the vehicle unit and method according to the present invention assure that a satellite position is valid by handling the position algorithm inside a secure microcontroller certified for high security applications to an Evaluation Assurance Level EAL4+ according to Common Criteria (CC).

According to one possible embodiment, the vehicle unit is further adapted to receive an open and non-secure GNSS position signal comprising non-secure real-time position data for the vehicle unit, and the secure processor or secure microcontroller unit (MCU) is adapted to compare the securely calculated position of the vehicle unit with the non-secure real-time position. By providing and comparing both secure and non-secure position data, the vehicle unit is in position to determine if the continuously provided non-secure position data have been manipulated or tampered with.

In a preferred embodiment, the vehicle unit further comprises a GNSS module node adapted to continuously calculate the open and non-secure real time position and transmit the non-secure real-time position to the vehicle unit. Advantageously, the GNSS module is located in a non-secure environment communicating with the vehicle unit over an interface. With this solution, the GNSS raw data signal is used both for calculating the non-secure real-time position and gatewayed unaltered to the secure environment, wherein the secure calculation of the position is carried out. Thus, a single device carries out both the non-secure and the secure calculations which simplifies the connections and configuration of the apparatus and eliminates the need for external devices to provide a GNSS position signal.

According to another possible embodiment, the vehicle unit is adapted to record an event if the securely calculated position of the vehicle unit differs from the non-secure real-time position by more than a predefined threshold value. By recording events as they occur, situations and/or locations where erroneous or manipulated position data are received may be monitored and reviewed to eliminate the causes therefor.

According to another possible embodiment, the vehicle unit is adapted to securely calculate a position of the vehicle unit based on the authenticated or to be authenticated GNSS raw data signal and the open and non-secure GNSS position signal. By using input from the open and non-secure GNSS position signal into the algorithm for securely calculating the position of the vehicle unit based on the authenticated or to be authenticated GNSS raw data signal, a less time consuming, yet secure, calculation can be carried out.

According to another possible embodiment, the vehicle unit is a digital tachograph.

In a second aspect of the present invention, there is provided a method performed by a vehicle unit positioning node for enabling secure positioning of a vehicle unit, whereby the method comprises:

receiving (S100) a GNSS raw data signal, authenticating (S110) the GNSS raw data signal, securely calculating a position of the vehicle unit based on the authenticated or to be authenticated GNSS raw data signal, wherein the secure calculation of the position of the vehicle unit is carried out in a secure environment.

According to another possible embodiment, the method further comprising:

receiving an open and non-secure GNSS position signal comprising non-secure real-time position data for the vehicle unit, comparing the securely calculated position of the vehicle unit based on the authenticated or to be authenticated GNSS raw data signal, with the non-secure real-time position of the open and non-secure GNSS position signal.

In a preferred embodiment, the method further comprises the step of:

continuously calculating the non-secure real time position in a non-secure environment and transmitting the non-secure real-time position to the vehicle unit positioning node.

According to another possible embodiment, the method further comprising:

recording an event if the securely calculated position of the vehicle unit based on the authenticated or to be authenticated GNSS raw data signal differs from the non-secure real-time position of the open and non-secure GNSS position signal by more than a predefined threshold value.

According to another possible embodiment, the method further comprising:

storing a securely calculated position of the vehicle unit based on the authenticated or to be authenticated GNSS raw data signal in a secure internal database.

According to another possible embodiment, the GNSS raw data signal is received from a GNSS module comprising a GNSS receiver and/or GPS receiver, such as e.g. a Telematics device or E-call device.

According to another possible embodiment, the GNSS position signal is received from a GNSS module comprising a GNSS receiver, e.g. GPS receiver, such as e.g. a Telematics device or E-call device.

According to another possible embodiment, the secure calculation of a position of the vehicle unit based on the authenticated or to be authenticated GNSS raw data signal is carried out by a secure microcontroller unit.

According to another possible embodiment, the secure calculation of the position of the vehicle unit is based on the authenticated or to be authenticated GNSS raw data signal and the open and non-secure GNSS position signal.

In a third aspect of the present invention, there is provided a vehicle unit positioning node for enabling secure positioning of the vehicle unit comprising a remote node communication unit arranged to receive a GNSS raw data signal, and a secure microcontroller unit adapted to authenticate the GNSS raw data signal and to securely calculate a position of the vehicle unit based on the authenticated or to be authenticated GNSS raw data signal.

According to another possible embodiment, the remote node communication unit is further arranged to receive an open and non-secure GNSS position signal, and the secure microcontroller unit is further arranged to compare the securely calculated position of the vehicle unit based on the authenticated or to be authenticated GNSS raw data signal, with the position of the GNSS position signal.

According to another possible embodiment, the vehicle unit positioning node is further arranged to record an event if the securely calculated position of the vehicle unit based on the authenticated or to be authenticated GNSS raw data signal differs from the non-secure real-time position of the GNSS position signal by more than a predefined threshold value.

According to another possible embodiment, the vehicle unit positioning node is further arranged to store the securely calculated position of the vehicle unit based on the authenticated or to be authenticated GNSS raw data signal in a secure internal database.

According to another possible embodiment, the secure microcontroller unit is further arranged to securely calculate a position of the vehicle unit based on the authenticated or to be authenticated GNSS raw data signal and the open and non-secure GNSS position signal.

According to another possible embodiment, a computer program is provided, comprising computer readable code means, which when run in a connected vehicle unit positioning node arranged to enable secure positioning of the vehicle unit causes the connected vehicle unit positioning node arranged to enable secure positioning of the vehicle unit to perform the method according to any of the method steps as described above.

According to another possible embodiment, a computer program product is provided, comprising a computer readable medium and a computer program as described above, wherein the computer program is stored on the computer readable medium.

According to another possible embodiment, a vehicle unit is provided comprising a vehicle unit positioning node as described above.

According to another possible embodiment, a vehicle or vessel is provided comprising a vehicle unit as described above.

According to another possible embodiment, a vehicle or vessel is provided comprising a vehicle unit positioning node as described above.

Further possible features and benefits of this solution will become apparent from the detailed description below.

BRIEF DESCRIPTION OF THE DRAWINGS

The invention will now be described, by way of example, with reference to the accompanying drawings, in which.

DETAILED DESCRIPTION OF THE INVENTION

In the following, a detailed description of the invention will be given:

The Global Navigation Satellite System, hereinafter referred to as GNSS, is a common name for a group of global navigation system comprising e.g. satellite systems like GPS, GLONASS, and Galileo etc. A GNSS module shall provide a Secure Access Module, or Secure Application Module (SAM) with time, position and raw satellite data. There, time and position shall be provided frequently and the satellite raw data shall be provided a couple of times every hour. The GNSS raw data signal comprises untreated and/or unaltered and/or unmodified data from the signal or information source, i.e. the Galileo satellite. The GNSS raw data signal may be authenticated to ensure its origin and comprises raw signal data.

In the context of the present invention, the term "authenticated GNSS signal" should be understood as a signal that is guaranteed to originate from a specific GNSS satellite. The signal itself is therefore to be trusted when used in calculations.

In the context of the present invention, the term "secure microcontroller" should be understood as a certified microcontroller for high security applications, for example certified towards Common Criteria EAL4 and/or ITSEC E3 HIGH. A secure microcontroller is used when demands on protection of data are high. It decreases risk for manipulation of data which therefore could be seen as trusted.

In the context of the present invention, the term "securely calculated" should be understood as indicating that calculation operations are performed inside a secure microcontroller.

In the context of the present invention, the term "secure position" (end-to-end secure position or trusted position) should be understood as a position securely calculated by using an authenticated or to be authenticated GNSS raw data signal.

Figure 1:
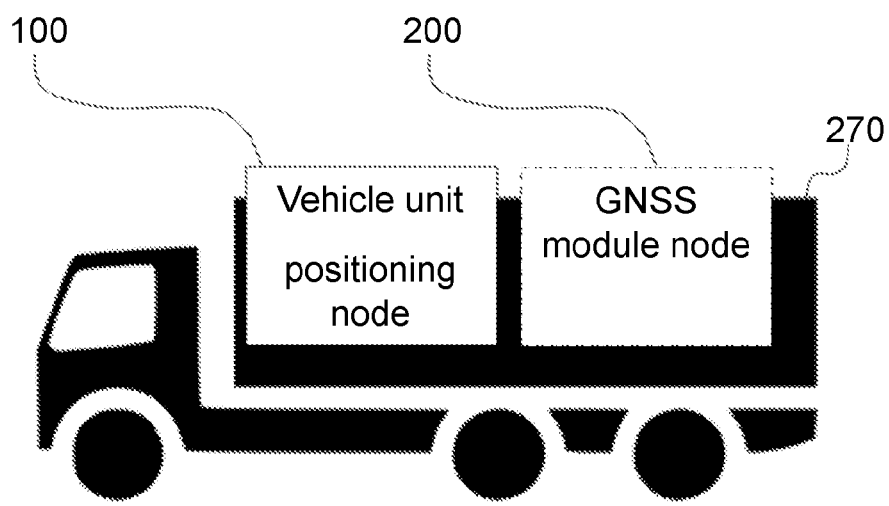
FIG. 1 illustrates a side view of a vehicle comprising a vehicle unit and/or a vehicle unit positioning node.

FIG. 1 illustrates a side view of a vehicle 270 comprising a vehicle unit 1 and/or a vehicle unit positioning node 100, wherein the vehicle positioning node 100 may comprise one of e.g. the following: a digital tachograph, a TEM (Telematics Module), a CEM (Central Electronics Module) or an ECU (Electronic Control Module). The vehicle 270 further comprises a GNSS module node 200, wherein the GNSS module node may comprise one of e.g. the following: a GNSS module, a Telematics module, an E-call module.

Figure 2:
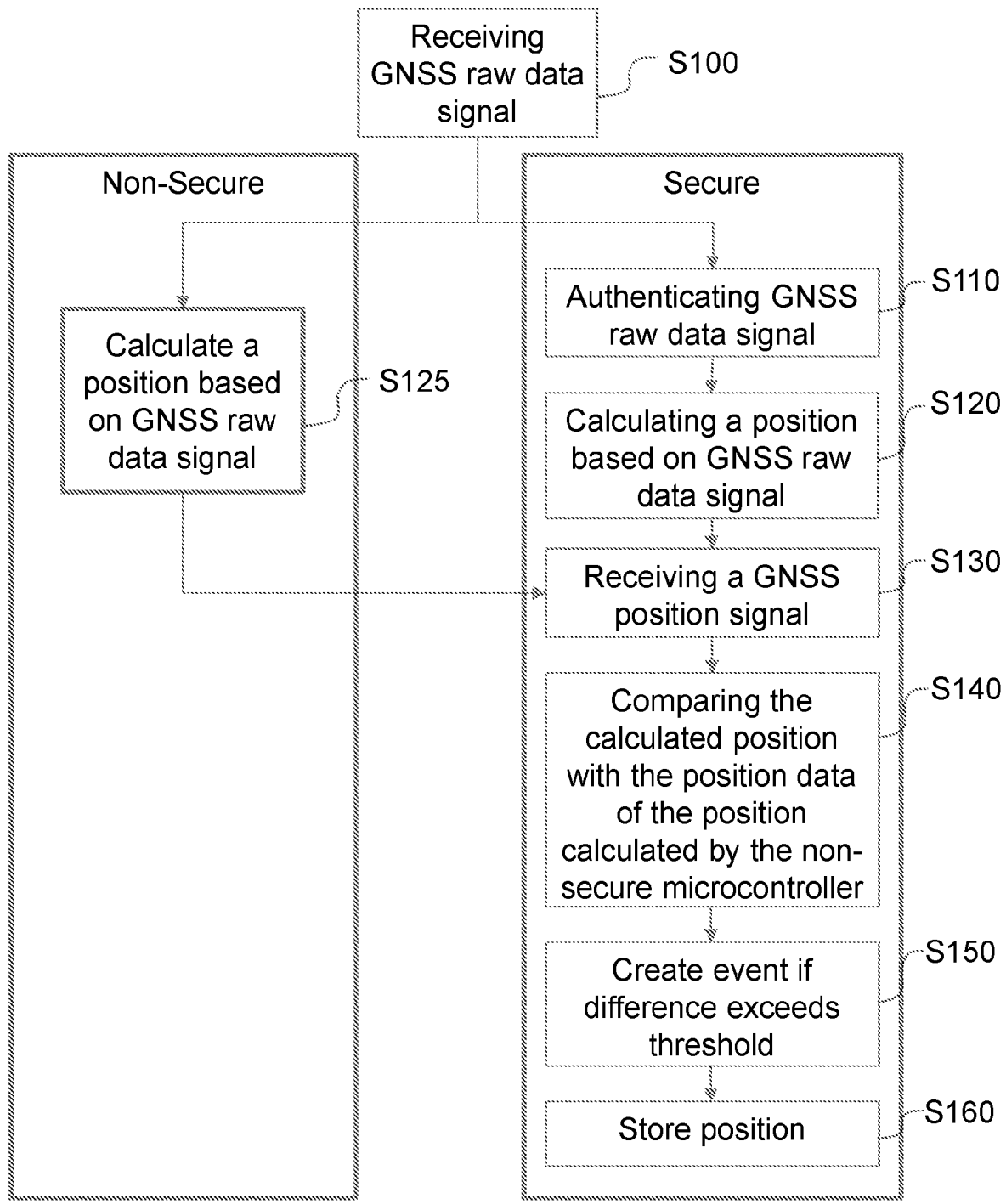
FIG. 2 is a flow chart illustrating a procedure in a vehicle unit positioning node.

A procedure or method in a vehicle unit positioning node 100 for enabling positioning of the vehicle unit 1 will now be described with reference to FIG. 2. The procedure or method is carried out inside the secure access module (SAM), i.e. in a secure environment as shown on the right hand side of FIG. 2.

In a first step S100, a GNSS raw data signal is received in a vehicle positioning node 100. GNSS raw data signal may for instance be received from a GNSS module node 200. The GNSS raw data signal may for instance be received from the GNSS module node either by wire, wirelessly via for example Wi-Fi/Wireless Local Area Network (WLAN), Bluetooth, Radio Frequency Identification (RFID), ZigBee not limiting to other wireless communication means suitable for short or media range wireless communication. In an embodiment the communication is performed over CAN bus (Controller Area Network). Such a CAN bus based communication may be performed by wire or wirelessly.

Figure 3:
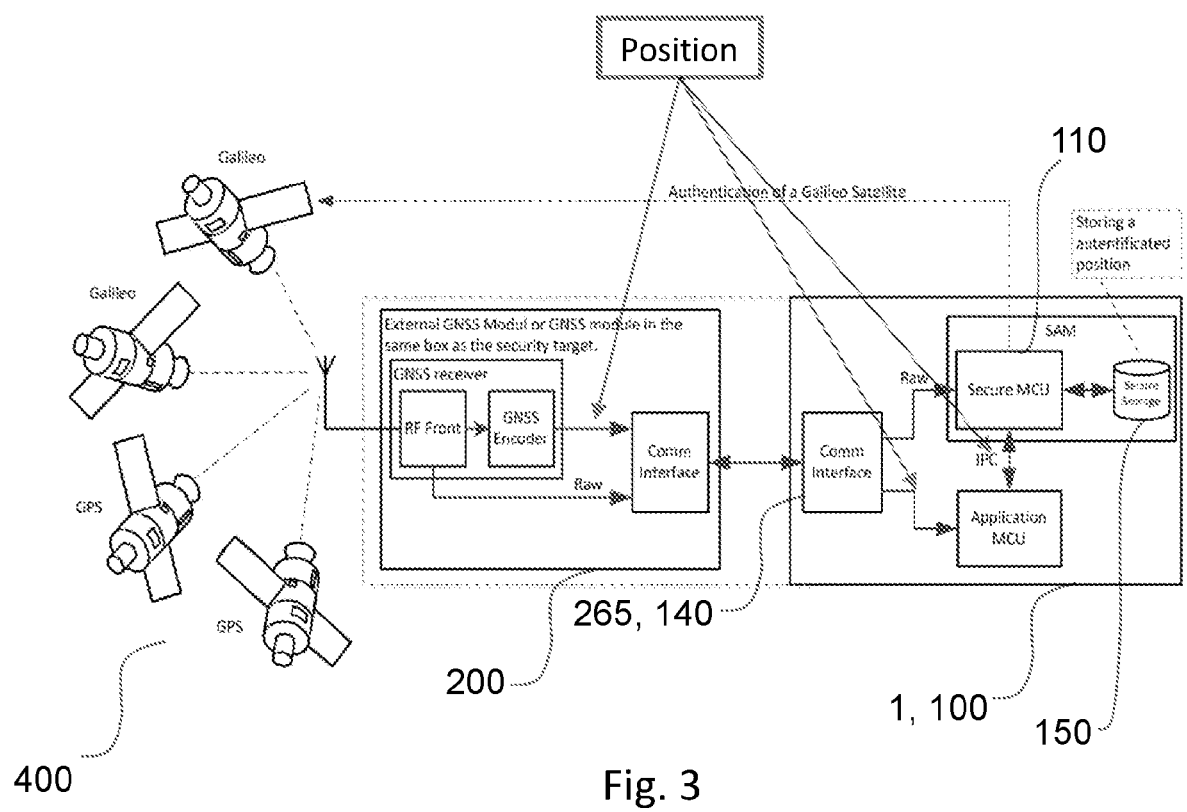
FIG. 3 is a block diagram illustrating embodiments of a positioning solution.

In a next step S110, the GNSS raw data signal is authenticated. The authentication step S110 may be carried out by a secure microcontroller unit 110 as seen in FIG. 3. Alternatively, the authentication step S110 may be carried out inside the secure access module (SAM). Advantageously, the secure microcontroller unit 110 is located inside the secure access module (SAM). A secure database 150 as seen in FIG. 3 is provided and comprised by the secure access module (SAM).

In a next step S120, the position of the GNSS module node 200/vehicle unit positioning node 100/vehicle unit 1 is calculated based on the authenticated or to be authenticated GNSS raw data signal. The calculation of the position may be carried out after the authentication step. As an alternative, the calculation of the position is carried out before the authentication step.

In a next step S130, the vehicle positioning node 100 receives a GNSS position signal comprising position data concerning the GNSS module node/vehicle positioning node 100/vehicle unit 1. This GNSS position signal provides open and non-secure GNSS position data which may be calculated by the GNSS module node 200 in a step S125, i.e. in a non-secure environment, as shown on the left hand side of FIG. 2 and transmitted to the vehicle positioning node 100. It is also foreseen to receive the GNSS position signal from an external GNSS device or receiver (not shown).

In a next step S140, the vehicle positioning node 100 compares the calculated position of the GNSS module node 200 and/or vehicle positioning node 100 based on the authenticated or to be authenticated GNSS raw data signal with the position data of the GNSS position signal.

In a next step S150 an event is recorded if the calculated position data of the GNSS module node 200/vehicle positioning node 100 based on the authenticated or to be authenticated GNSS raw data signal differs from the position data of the GNSS position signal by more than a predefined threshold value.

In a next step S160, the vehicle positioning node 100 stores a calculated position of the GNSS module node 200/vehicle positioning node 100 in a secure internal database 150.

FIG. 3 shows an illustration of embodiments with the vehicle unit positioning node 100, a GNSS module node 200, a remote node 400 in the form of navigation satellites comprising at least one satellite e.g. a Galileo satellite, but preferably four satellites for providing e.g. GNSS raw data signals which may be authenticated to the GNSS module node 200.

Figure 4:
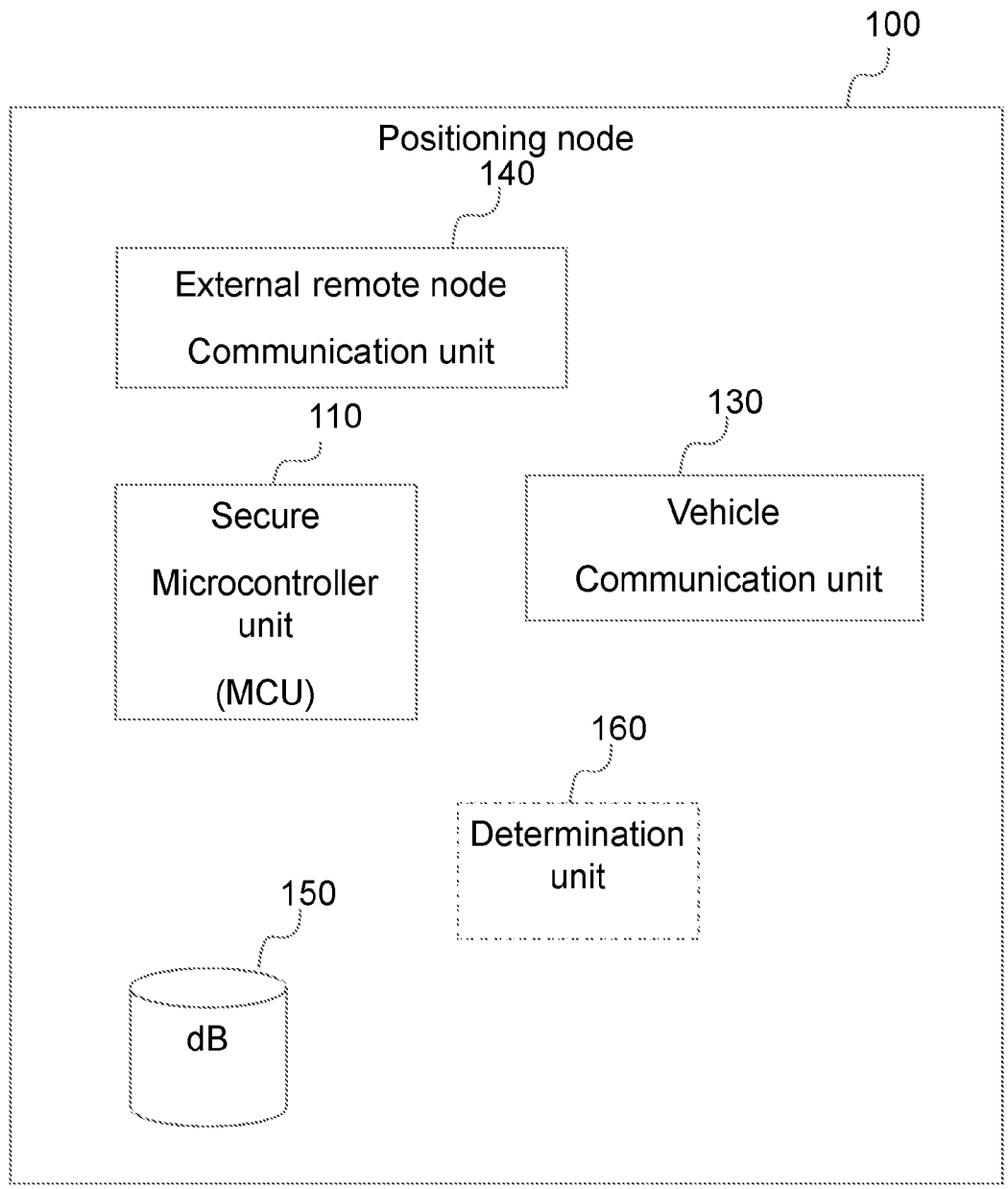
FIG. 4 illustrates example embodiments of a vehicle unit positioning node.

FIG. 4 discloses a vehicle unit positioning node 100 for enabling positioning of a vehicle unit. The node 100 is arranged to receive GNSS raw data signal by an external remote node communication unit 140, such as for instance a Communication interface. The node 100 is further arranged to authenticate the GNSS raw data signal by a secure microcontroller unit 110. The authentication is carried out by using a stored Galileo crypto key, which may be stored in the secure database 150 inside the secure access module (SAM). The vehicle unit positioning node 100 may further be arranged to calculate the position of the vehicle unit positioning node 100/vehicle unit 1 based on the authenticated or to be authenticated GNSS raw data signal. The calculation is carried out by a secure microcontroller unit 110. The vehicle unit positioning node 100 may further be arranged to receive a GNSS position signal comprising position data concerning the GNSS module node/vehicle positioning node 100 by an external remote node communication unit 140. The vehicle unit positioning node 100 may further be arranged to compare the calculated position data of the vehicle unit positioning node 100/vehicle unit 1 based on the authenticated or to be authenticated GNSS raw data signal with the position data of the GNSS position signal by the secure microcontroller unit 110. The vehicle unit positioning node 100 may further be arranged to record an event if the calculated position data of the GNSS module node 200/vehicle positioning node 100/vehicle unit 1 based on the authenticated or to be authenticated GNSS raw data signal differs from the position data of the GNSS position signal by more than a predefined threshold value. The threshold value may be configurable. In one example, the threshold value corresponds to a city size. Alternatively, the threshold value corresponds to $\frac{1}{10}$ of a minute, thus using geographical coordinates of latitude and longitude in degrees and minutes. The vehicle unit positioning node 100 may further be arranged to store a calculated position of the GNSS module node 200/vehicle positioning node 100/vehicle unit 1 in a secure internal database 150.

Figure 5:
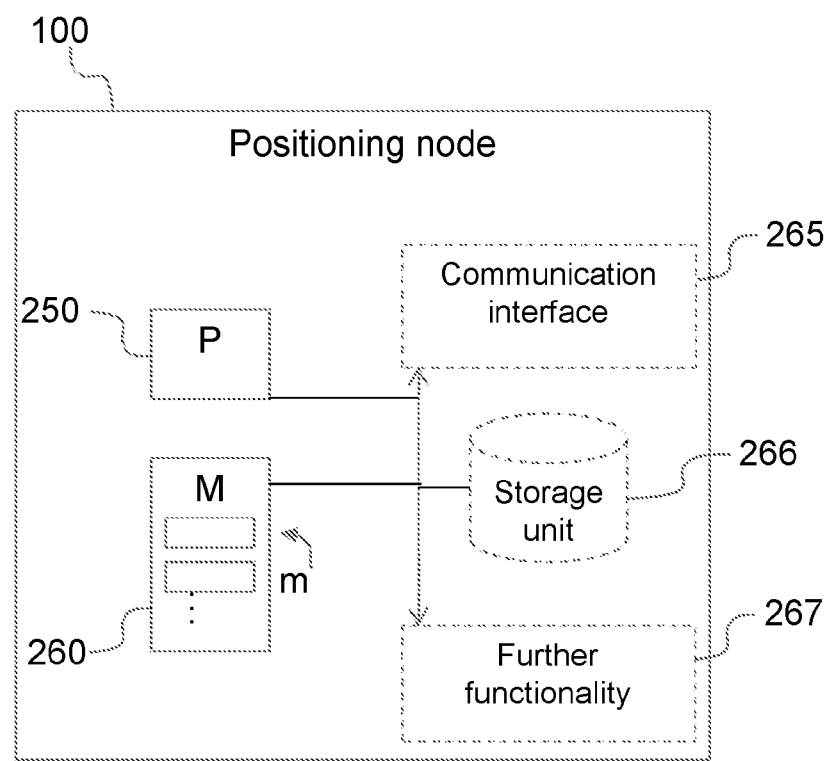
FIG. 5 shows an illustration of embodiments of a vehicle unit positioning node.

FIG. 5 shows an illustration of embodiments of a vehicle unit positioning node 100. The vehicle unit positioning node 100 may be implemented, by means of program modules of a respective computer program comprising code means which, when run by a processing unit 250 causes the vehicle unit positioning node 100 to perform the above-described actions. The processing unit 250 may comprise a single Central Processing Unit (CPU), or could comprise two or more processing units. For example, the processing unit 250 may include general purpose microprocessors, instruction set processors and/or related chips sets and/or special purpose microprocessors such as Application Specific Integrated Circuits (ASICs). The processing unit 250 may also comprise a storage for caching purposes.

Each computer program may be carried by a computer program product 260 in the vehicle unit positioning node 100, shown in FIGS. 1, 2, 3, 4, 5, et al, in the form of a memory having a computer readable medium and being connected to the processing unit 250. The computer program product 260 or memory thus comprises a computer readable medium on which the computer program is stored e.g. in the form of computer program modules "m". For example, the memory 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the vehicle unit positioning node 100.

The vehicle unit positioning node 100 may further comprise a communication interface 265. The communication interface 265 may be arranged to communicate with for example the GNSS module node 200. In an embodiment the communication interface 265 may comprise chip set adopted for communication via CAN bus (Controller Area Network) or communication adopted to ISO 11898. Other examples of standards which may be supported by the communication interface 265 are: ZigBee, Bluetooth, RFID (Radio frequency identification), USB (Universal serial bus), or IEEE 802.11 (Institute of Electrical and Electronics Engineers), including but not limited to 802.11a/b/n or other similar forthcoming standards. The communication interface 265 may comprise an antenna. The communication interface 265 may be connectable to an external antenna. The vehicle unit positioning node 100 may further comprise one or more storage units 266 and further functionality 267 useful for the vehicle unit positioning node 100 to serve its purpose as vehicle unit positioning node, such as power supply, internal communications bus, internal cooling, database engine, operating system, not limiting to other functionalities.

The purpose with providing the raw satellite signal which may be authenticated is the following:
1. Assure that the satellite data is broadcasted from a valid Galileo satellite by authenticating the signal. The authentication is done on the SAM by a stored Galileo crypto certificate, key or similar.
2. Calculate position and time within the SAM.
3. The SAM validates provided position with the result from the position algorithm, to assure that the provided position is not spoofed (jammed, and/or tampered with)

In order to accelerate the position algorithm, the provided time and position may be used to initialize the algorithm running on the SAMs Microcontroller unit MCU, with actual time and position. Without this initializing, the calculation could take several minutes. Without this initializing, it also generates a high MCU load before the position algorithm could establish a position fixation.

The GNSS module 200 mentioned below could be any today existing telematics unit of the vehicle.
1. At least four satellites from at least one is a Galileo providing a signal which may be authenticated.
2. Antenna for the satellite signals
3. Receiver with two functionalities, first to transmit (or "gateway") the signal without any changes of signal and second to use the signals to calculate a position. This calculated position is non-secure.
4. A communication interface from the GNSS module to the vehicle unit, e.g. a digital tachograph.
5. A connection between communication interface and vehicle unit, e.g. digital tachograph.
6. A communication interface inside the vehicle unit, e.g. digital tachograph.
7. The communication interfaces and connection in-between (i.e. 4, 5 and 6) might not be needed if the GNSS module is inside the vehicle unit, e.g. a digital tachograph.
8. A secure microcontroller unit MCU (e.g. SAM) inside the vehicle unit, e.g. digital tachograph that receives the raw data (i.e. the signal undestroyed as it looks like from Galileo and which may be authenticated) and the position calculated by the GNSS module.
9. A non-secure microcontroller unit MCU inside the vehicle unit, e.g. a digital tachograph that receives the position calculated by the GNSS module.

In order to fulfil end-to-end security, the following steps may be performed:
1. An open and non-secure real time position is continuously calculated by the GNSS module and transmitted to the VU e.g. digital tachograph.
2. The GNSS signal which may be authenticated is "gatewayed" to the security part, e.g. SAM, of the vehicle unit, e.g. digital tachograph.
3. The secure position is periodically calculated by the secure microcontroller unit MCU (e.g. SAM or part of SAM).
4. The secure position is periodically evaluated, i.e. compared with the non-secure calculation of position. If the secure and non-secure positions differs too much, say for example more than to a city size level, then an event is recorded to indicate manipulation.
5. The identities of the satellites are periodically verified (authenticated). This proves that the signal (and subsequently the position) origins from the specific Galileo satellite, thus meaning the position is trusted and not manipulated.

A calculation of position is time consuming and demands comparably strong microprocessors. By using the non-secure calculated position as input to the algorithm of the secure microcontroller unit/SAM, the secure calculation performed by secure microcontroller unit/SAM will be faster.

This solution is a low cost architectural solution. Arguments for this are:

According to one embodiment, no additional GNSS module is necessary if the vehicle already has telematics unit installed (which is the case at least from year 2019 when the legislation 165/2014 is expected to come into force).

No additional antenna, same reason as above. Also leave space on the wind screen which is good for traffic safety.

No Type Approval or security certificate of either GNSS module or connection between GNSS module and vehicle unit, e.g. digital tachograph needed.

No need for a powerful processor with ability to calculate position continuously (or at least once every second) and at the same time is security certified to CC EAL4+ level. This kind of component does not exist on the market today.

A preferred embodiment of a vehicle unit according to the invention has been described. However, the person skilled in the art realizes that this can be varied within the scope of the appended claims without departing from the inventive idea.

All the described alternative embodiments above or parts of an embodiment can be freely combined without departing from the inventive idea as long as the combination is not contradictory.

The invention claimed is:

1. A vehicle unit adapted to receive a GNSS raw data signal, the vehicle unit comprises a secure microcontroller unit (MCU) adapted to authenticate the GNSS raw data signal and securely calculate a position of the vehicle unit based on the authenticated or to be authenticated GNSS raw data signal, wherein the vehicle unit is further adapted to receive an open and non-secure GNSS position signal comprising a calculated non-secure real-time position of the vehicle unit and the secure microcontroller unit (MCU) is adapted to compare the securely calculated position of the vehicle unit with the non-secure real-time position, wherein the secure microcontroller unit is further arranged to use the calculated non-secure real time position of the vehicle unit as input from the open and non-secure GNSS position signal to securely calculate a position of the vehicle unit based on the authenticated or to be authenticated GNSS raw data signal.

2. The vehicle unit according to claim 1, further comprising a GNSS module node adapted to continuously calculate the non-secure real time position and transmit the non-secure real-time position to the vehicle unit.

3. The vehicle unit according to claim 1, wherein the vehicle unit is adapted to record an event if the securely calculated position of the vehicle unit differs from the non-secure real-time position by more than a predefined threshold value.

4. The vehicle unit according to claim 1, wherein the vehicle unit is a digital tachograph.

5. Method performed by a vehicle unit positioning node, for enabling secure positioning of a vehicle unit, the method comprising:
receiving a GNSS raw data signal;
authenticating the GNSS raw data signal;
securely calculating a position of the vehicle unit based on the authenticated or to be authenticated GNSS raw data signal, wherein the secure calculation of the position of the vehicle unit is carried out in a secure environment;
receiving an open and non-secure GNSS position signal comprising a calculated non-secure real-time position of the vehicle unit; and
comparing the securely calculated position of the vehicle unit based on the authenticated or to be authenticated GNSS raw data signal, with the non-secure real-time position of the open and non-secure GNSS position signal,
wherein the secure calculation of the position of the vehicle unit based on the authenticated or to be authenticated GNSS raw data signal uses the calculated non-secure real time position of the vehicle unit as input from the open and non-secure GNSS position signal.

6. The method according to claim 5, further comprising:
continuously calculating the non-secure real time position in a non-secure environment and transmitting the open and non-secure real-time position to the vehicle unit positioning node.

7. The method according to claim 5, further comprising:
recording an event if the securely calculated position of the vehicle unit based on the authenticated or to be authenticated GNSS raw data signal differs from the non-secure real-time position of the open and non-secure GNSS position signal by more than a predefined threshold value.

8. The method according to claim 5, further comprising:
storing the securely calculated position of the vehicle unit based on the authenticated or to be authenticated GNSS raw data signal in a secure internal database.

9. The method according to claim 5, wherein the GNSS raw data signal is received from a GNSS module comprising a GNSS receiver and/or GPS receiver, such as e.g. a Telematics device or E-call device.

10. The method according to claim 5, wherein the open and non-secure GNSS position signal is received from a GNSS module comprising a GNSS receiver and/or GPS receiver, such as e.g. a Telematics device or E-call device.

11. The method according to claim 5, wherein the secure calculation of the position of the vehicle unit based on the authenticated or to be authenticated GNSS raw data signal is carried out by a secure microcontroller unit.

12. A computer program, comprising non-transitory computer readable code means, which when run in a connected vehicle unit positioning node arranged to enable secure positioning of the vehicle unit causes the connected vehicle unit positioning node to perform the method according to claim 5.

13. A computer program product, comprising a non-transitory computer readable medium and a computer program according to claim 12, wherein the computer program is stored on the non-transitory computer readable medium.

14. A vehicle unit positioning node, for enabling secure positioning of the vehicle unit, comprising a remote node communication unit, arranged to receive a GNSS raw data signal, and a secure microcontroller unit, adapted to authenticate the GNSS raw data signal and to securely calculate a position of the vehicle unit based on the authenticated or to be authenticated GNSS raw data signal, wherein the remote node communication unit is further arranged to receive an open and non-secure GNSS position signal comprising a calculated non-secure real-time position of the vehicle unit, and the secure microcontroller unit is further arranged to compare the securely calculated position of the vehicle unit, with the non-secure real-time position, wherein the secure microcontroller unit is further arranged to use the calculated non-secure real time position of the vehicle unit as input from the open and non-secure GNSS position signal to securely calculate a position of the vehicle unit based on the authenticated or to be authenticated GNSS raw data signal.

15. The vehicle unit positioning node according to claim 14, further comprising a GNSS module node adapted to continuously calculate the non-secure real time position and transmit the non-secure real time position to the vehicle unit positioning node.

16. The vehicle unit positioning node according to claim 15, further being arranged to record an event if the securely calculated position of the vehicle unit based on the authenticated or to be authenticated GNSS raw data signal differs from the non-secure real-time position of the open and non-secure GNSS position signal by more than a predefined threshold value.

17. The vehicle unit positioning node according to claim 14, further comprising a secure internal database arranged to store the securely calculated position of the vehicle unit based on the authenticated or to be authenticated GNSS raw data signal.

18. Vehicle unit comprising a vehicle unit positioning node according to claim 14.

19. Vehicle or vessel comprising a vehicle unit according to claim 18.

20. Vehicle or vessel comprising a vehicle unit positioning node according to claim 14.

\* \* \* \* \*